United States Patent [19]

Schuler et al.

[11] 4,159,197
[45] Jun. 26, 1979

[54] SUSPENSION GASKET SEAL AND SYSTEM FOR BAGHOUSE FILTER UNITS

[75] Inventors: Frederick E. Schuler, St. Paul; Robert A. Skuster, Minneapolis, both of Minn.

[73] Assignee: Donaldson Company, Inc., Minneapolis, Minn.

[21] Appl. No.: 839,436

[22] Filed: Oct. 5, 1977

[51] Int. Cl.² .......................................... B01D 46/02
[52] U.S. Cl. .................................... 55/379; 55/302; 55/502; 55/507; 210/461; 210/462
[58] Field of Search ................... 55/302, 374, 375–379, 55/502, 505, 507, 513, 503, 504; 210/441, 449, 460–462; 277/201, 202, 214, 215; 285/235, 239, DIG. 22

[56] References Cited

U.S. PATENT DOCUMENTS

| 519,664 | 5/1894 | Chamberland | 210/462 |
|---|---|---|---|
| 1,180,733 | 4/1916 | Mulherin | 285/235 |
| 2,196,337 | 4/1940 | Loweke | 277/214 |
| 2,460,851 | 2/1949 | Sheppard | 55/375 |
| 2,805,731 | 9/1957 | Kron | 55/378 |
| 2,927,659 | 3/1960 | Pabst et al. | 55/379 |
| 3,201,927 | 8/1965 | Wachter | 55/504 |
| 3,667,785 | 6/1972 | Kapeker | 285/DIG. 22 |
| 3,680,285 | 8/1972 | Wellan et al. | 55/302 |
| 3,844,750 | 10/1974 | Ray | 55/379 |
| 3,937,621 | 2/1976 | Gravley | 55/377 |
| 3,942,962 | 3/1976 | Duyckinck | 55/302 |
| 4,007,026 | 2/1977 | Groh | 55/302 |

Primary Examiner—Frank W. Lutter
Assistant Examiner—David L. Lacey
Attorney, Agent, or Firm—Merchant, Gould, Smith, Edell, Welter & Schmidt

[57] ABSTRACT

An improved gasket means for suspending a filter element from a venturi air nozzle in a dust collector. The gasket means is an annular member of elastomeric material and has an annular recess in the inner side wall in which is received the flared bottom lip of the venturi air nozzle. The annular recess is disposed between first and second rim portions. The annular member has an inside diameter at the second rim portion greater than the inside diameter at the second rim portion. The gasket means includes a structure for securing a filter element to the annular member.

13 Claims, 7 Drawing Figures

SUSPENSION GASKET SEAL AND SYSTEM FOR BAGHOUSE FILTER UNITS

BACKGROUND OF THE INVENTION

The present invention relates to an improved gasket means for use in a dust collector, and in particular, for an improved gasket means for suspending a filter element from a venturi air nozzle in a dust collector.

Dust collectors of the type in which the improved gasket means of the present invention is utilized are well-known in the art. Typically, such dust collectors include a housing partitioned into a dust-laden air chamber and a clean air chamber. Venturi air nozzles provide fluid communication between the two chambers. A filter element, which may be a bag-type filter medium or a pleated paper cartridge type element, is generally secured to the venturi air nozzle. In a typical unit, anywhere from seventy to eighty air nozzles and associated filter elements may be utilized. In operation, the dust-laden air is drawn through the filter element into the venturi air nozzle and then into the clean air chamber. The dust is deposited or collected generally on the exterior of the bag-type filter or by the pleated paper media of a filter cartridge. Periodically, short bursts or pulses of air are directed in a reverse-flow from the clean air chamber into the filter element to drive the collected dust from the filter element. The dust falls into a collection bin and is subsequently removed.

The prior art dust collector units, in particular those utilizing bag-type filter elements, have demonstrated significant disadvantages with regard to replacement of a malfunctioning or leaking bag and the filter element installation procedures in general. For example, in prior art dust collectors, or baghouses, if a single bag develops a leak, generally each bag between the leaking bag and the baghouse access door must necessarily be removed in order to manually reach the clamp device securing the failed bag. Thus, as a result of a single bag failure, the baghouse or dust collector is inoperative for extended periods of time while bags are being removed and replaced. In the industrial environment, it often becomes necessary to provide a standby baghouse or to completely shut down a production line to avoid being cited for violations of clean air standards.

Additionally, in the prior art baghouses, the procedure of clamping the bags in place is extremely critical and a failure to properly clamp a bag could result in leakage of dust-laden air into the clean air chamber. In these instances, as a result of human error in the bagging procedure, it is not uncommon that a newly rebagged collector must be shut down in order to reclamp a bag improperly installed.

The present invention eliminates these disadvantages of the prior art systems in that it is an improved gasket means for securing either a pleated paper filter cartridge element or a bag-type filter element to a venturi air nozzle in a dust collector. The gasket is designed for secure sealing engagement with the bottom lip of the venturi air nozzle substantially eliminating the problem associated with leaks in the prior art dust collector units. The present invention is also characterized by simplicity of installation of the gasket on the venturi air nozzle. It is readily apparent when the gasket means of the present invention is properly or improperly seated on the venturi air nozzle so that the problems of improper installation are eliminated. The relative ease of installation also substantially reduces the amount of time required to service the dust collector unit. In particular, an entire dust collector unit or baghouse can be rebagged in one-third or less of the time required in the prior art systems. Therefore, operator maintenance time and down time of the collector unit in industrial production lines is significantly reduced.

SUMMARY OF THE INVENTION

The present invention is an improved gasket means for securing a filter element to a flared bottom lip of a venturi air nozzle in a dust collector. The improved gasket means comprises an annular member of elastomeric material having first and second ends and inner and outer side walls. An annular recess is formed in the inner side wall and the flared bottom lip of the venturi air nozzle is received within the annular recess. The annular recess is disposed between first and second rim portions on the inner side wall of the annular member. The annular member has a first inside diameter at the first rim portion and a second inside diameter at the second rim portion. The second inside diameter is selected to be greater than the first inside diameter. The improved gasket means further includes means for securing a filter element to the second end of the annular member.

In one preferred embodiment of the present invention, a second annular recess is formed on the inner side wall of the elastomeric annular member. The outer side wall of the annular member slopes rapidly in a direction away from the central longitudinal axis of the annular member proximate the second end of the annular member. The second end has a substantially planar bottom surface which is adhesively secured to a metal end cap of a cartridge type pleated paper filter element. The second end of the annular member has a central portion, and inner and outer edge portions. The widths of the inner and outer edge portions measured in a direction generally along the central longitudinal axis of the annular member is substantially smaller than the width of the central portion to concentrate the downward tensile forces of the filter element in the central portion. The outer surface of the annular member is provided with an integral shoulder portion about which can be placed a locking ring. Finally, the annular member has an inside diameter which gradually decreases from the first end to the first rim portion. The inside diameter of the annular member at the first annular recess is slightly smaller than the outside diameter of the flared bottom lip of the venturi air nozzle.

In one alternative embodiment of the present invention, the gasket means is molded integrally with the cartridge type filter element. The filter element may be provided with an annular metal end cap with apertures therein through which the elastomeric material of the gasket can flow in a liquid state during the integral molding thereof. Spring-like metal fingers may be affixed to the annular metal end caps and imbedded within the elastomeric annular member and biased in a direction generally toward a central longitudinal axis of the annular member to increase the retaining force of the gasket.

An alternative embodiment of the improved gasket of the present invention is also disclosed for use with conventional bag-type filter elements. In particular, in one embodiment the annular gasket has a tubular portion at the second end thereof. A bag cage collar is received within the tubular portion and a clamp is secured about the outer surface of the tubular portion to retain the bag cage therein. Alternatively, the bag cage can be integrally molded within the second end of the annular gasket member.

In either embodiment of the present invention, the improved gasket means is capable of withstanding a substantial downward pull-off force. Additionally, an effective leak-proof seal is provided between the annular lip of the venturi air nozzle and the gasket. As will be described in more detail hereafter, the installation procedures with regard to the present invention significantly reduce the time required to install filter elements in the dust collector and are substantially foolproof, i.e., immune from human error in the installation which could result in leakage of dust-laden air into the cleam air chamber. These and other advantages of our invention will become apparent with reference to the accompanying drawings, the detailed description of the preferred embodiment, and claims.

DETAILED DESCRIPTION OF THE PREFERRED EMBODIMENT

Figure 1:
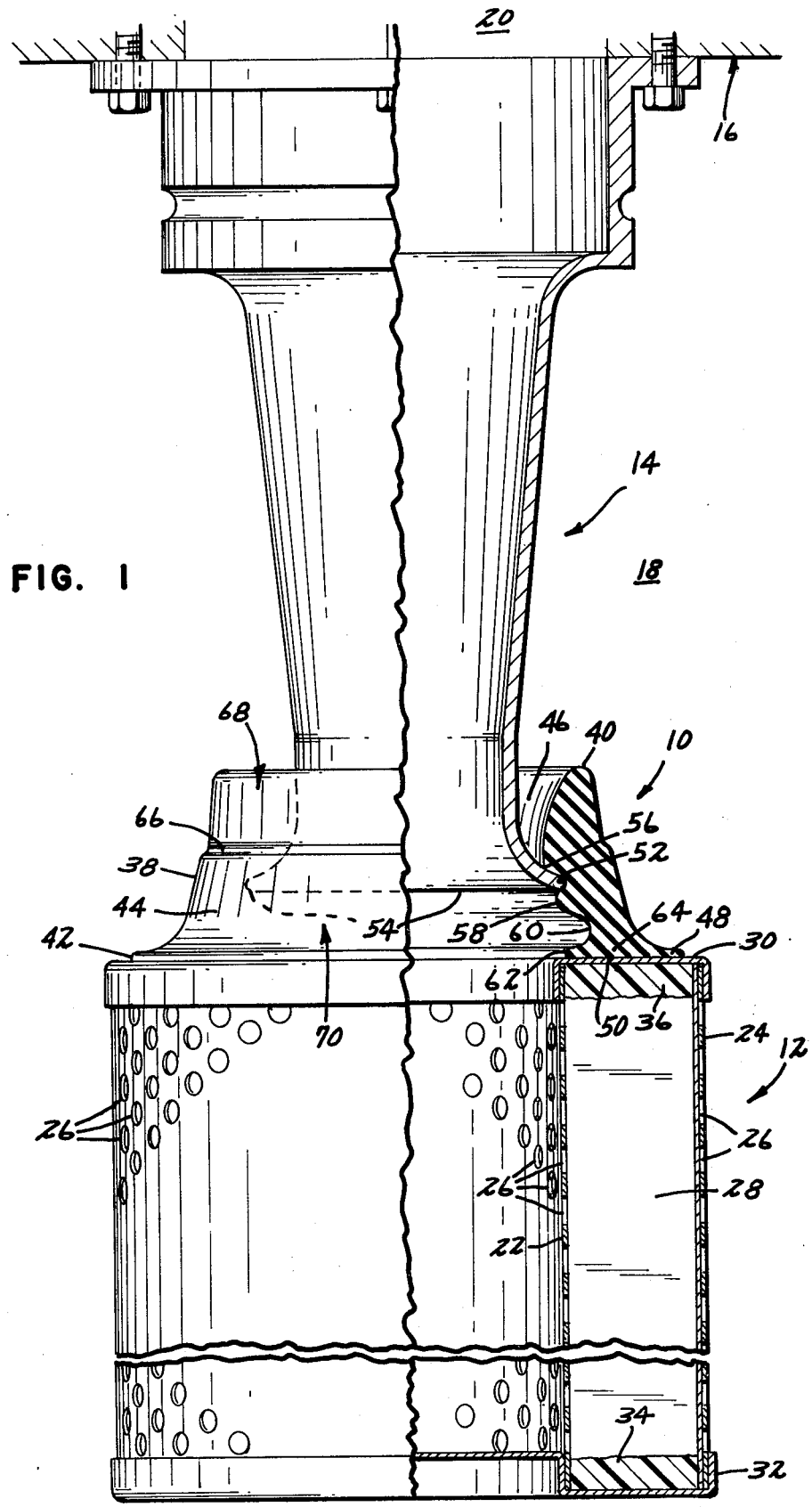
FIG. 1 is an elevational view of one embodiment of the present invention with portions thereof broken away and shown in section.

Referring to the drawings, wherein like numerals represent like parts throughout the several views, one embodiment of the present invention is illustrated in FIG. 1. A gasket 10 is provided for attaching a filter 12 to a venturi air nozzle 14. Typically, a dust collector unit will have a plurality of such venturi air nozzles mounted to a partition plate 16 that divides the dust collector interior into a dustladen chamber 18 and a clean air chamber 20. In the operation of such a dust collector, air is drawn through filter 12 which separates dust from the air and the cleaned air passes through air nozzle 14 into chamber 20. Periodically, a short reverse pulse of air is directed through venturi air nozzle 14 into filter 12 driving dust collected by filter 12 from the filter medium.

In the embodiment shown in FIG. 1, filter 12 includes concentric inner and outer walls 22 and 24 each of which is provided wth apertures 26. Disposed between walls 22 and 24 is an annular filter element 28 which may be a conventional pleated paper type filter medium. Filter 12 has annular metal end caps 30 and 32 that are essentially U-shaped in cross section. A potting compound, as indicated at 34 and 36 is utilized to seal the top and bottom ends of filter element 28 to end caps 30 and 32. Although a specific filter structure is disclosed, it will be understood that alternative equivalent filters may be utilized in conjunction with gasket 10 within the spirit and scope of the present invention.

Gasket 10 is an annular member 38 formed of a suitable elastomeric material, such as a synthetic or natural rubber or other elastomer, for example, foamed urethane or silicone rubber. Annular member 38 has a first end 40, a second end 42, an outer side wall 44 and an inner side wall 46. Annular member 38 has a central longitudinal axis and outer side wall 44 slopes gradually outward with respect to the central longitudinal axis from first end 40 toward second end 42. Proximate second end 42 outer side wall 44 slopes more rapidly in a direction away from the central axis of annular member 38 to define an outer edge portion 48. Second end 42 has a substantially planar bottom surface 50 that may be adhesively secured to end cap 30. A first annular recess 52 is provided on inner side wall 46. Annular member 38 has an inside diameter at annular recess 52 slightly smaller than the outside diameter of an outwardly flared bottom lip 54 of venturi air nozzle 14. Annular recess 52 is positioned between a first annular rim portion 56 and a second annular rim portion 58. The inside diameter of annular member 38 is greater at rim portion 58 than at rim portion 56. Additionally, the inside diameter of annular member 38 decreases gradually from first end 40 at which point the inside diameter of annular member 38 is larger than the outside diameter of flared bottom lip 54 to annular rim portion 56 at which point the inside diameter of annular member 38 is smaller than the outside diameter of flared bottom lip 54. Flared bottom lip 54 will thus be captured within annular recess 52 between rim portions 56 and 58.

Annular member 38 is further provided with a second annular recess 60 proximate second end 42. The inside diameter of annular member 38 at annular recess 60 is greater than the inside diameters at annular rim portions 56 and 58 and first annular recess 52. Second end 42 has an inner edge portion 62 defined in part by annular recess 60. Second end 42 also has a central portion 64. The width of central portion 64 as measured along the central axis of annular member 38 is substantially greater than the width of outer edge portion 48 and inner edge portion 62. In the preferred embodiment, the width of the inner and outer edge portions progressively decreases to about 0.06 inches at the outer and inner peripheries. This structure of second end 42 provides gradual stress relief of the tension generated by the weight of filter 12 within gasket 10. In the embodiment shown in FIG. 1, the tensile stress distribution will have a maximum somewhere near the center of central portion 64 and will taper to zero at the inner and outer peripheries of edge portions 62 and 48. Thus, a substantially failure-proof bond is established between annular member 38 and filter 12 since there is virtually no stress in the adhesive bond at the edges of second end 42 which would tend to create a propagating adhesive bond failure.

In the preferred embodiment, the inside diameter of annular member 38 at recess 52 is typically selected to be between 0.005–0.035 inches smaller than the outside diameter of flared bottom lip 54 providing an adequate seal between bottom lip 54 and annular member 38 without overstressing gasket 10. The diameter of rim portion 56 is selected in combination with other factors to provide a desired pull-off load factor. The shape of inner side wall 46 from first end 40 to annular rim portion 56 permits gasket 10 to be placed onto flared bottom lip 54 with a minimum of effort as will be described in more detail hereafter. Annular rim portion 58 stabilizes gasket 10 against lateral wobbling when bottom lip 54 is within recess 52.

As previously mentioned, outer side wall 44 slopes gradually in a direction away from the central longitudinal axis of annular member 38 from first end 40 towards second end 42. A shoulder portion 66 divides outer side wall 44 into an upper portion 68 with a conical outer surface having a five degree taper from the cylindrical and a lower portion 70 having an outer surface with approximately a 15 degree taper from the cylindrical. If desired, a locking ring (not shown) can be placed about shoulder portion 66.

Filter 12 with gasket 10 adhered thereto is installed on venturi air nozzle 14 in the following manner. First, filter 12 is held such that the central longitudinal axis of gasket 10 is at approximately a 30 degree angle with respect to a central longitudinal axis of venturi air nozzle 14. Filter 12 is then pushed upward with gasket 10 riding over flared bottom lip 54 of venturi air nozzle 14. While maintaining upward pressure, filter 12 is rotated toward a vertical position in which the axes of gasket 10 and air nozzle 14 are aligned and is also twisted in a circular motion. Flared bottom lip 54 will then be located within the annular recess 60. To seat flared bottom lip 54 within annular recess 52, the filter element and gasket assembly is pulled down until annular rim portion 58 rides over bottom lip 54. Since the inside diameter of rim portion 58 is larger than the inside diameter at rim portion 56, the gasket will not be pulled off of air nozzle 14 during this operation of seating flared bottom lip 54 within annular recess 52. To remove the filter and gasket assembly from venturi air nozzle 14, the assembly is displaced 20 to 30 degrees from the vertical thereby unseating a portion of flared bottom lip 54 from annular recess 52 into annular recess 60. A portion of flared bottom lip 54 opposite the portion displaced from annular groove 52 is forced into inner side wall 46 above rim portion 56 by pressure from the opposite side of gasket 10 on venturi air nozzle 14. The filter element and gasket assembly is then pulled down to complete the removal from venturi air nozzle 14.

The pull-off load of the gasket, i.e., the maximum safe load that can be supported by the gasket, is dependent upon the inside diameter of annular member 38 at rim portion 56, the durometer of the elastomeric material selected, the integral of the thickness of the gasket times the height of the gasket above annular recess 60, and the average diameter of annular member 58 above annular recess 60. In a preferred form of the present invention, a pull-off force of approximately 200 pounds is achieved utilizing 60 durometer neoprene rubber.

Figure 2:
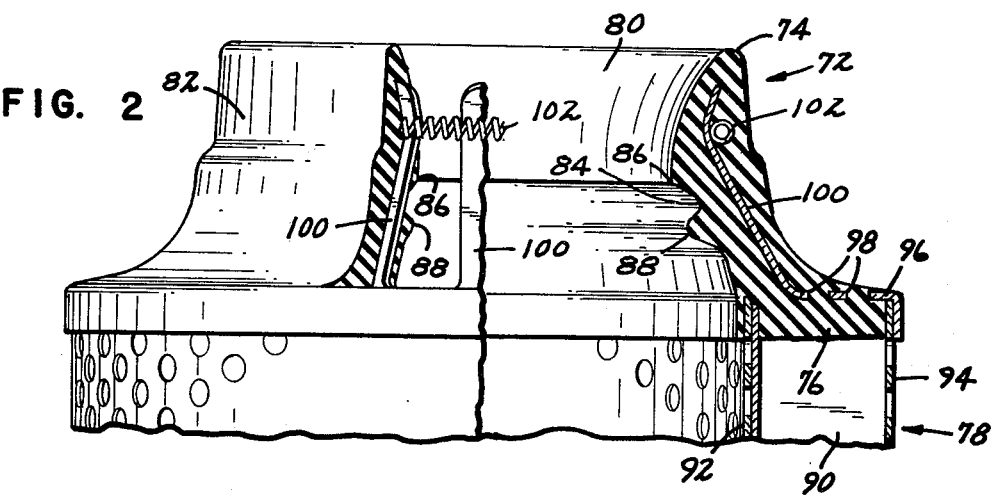
FIG. 2 is a partial elevational view of an alternative embodiment of the present invention with portions thereof broken away and shown in section.
Figure 3:
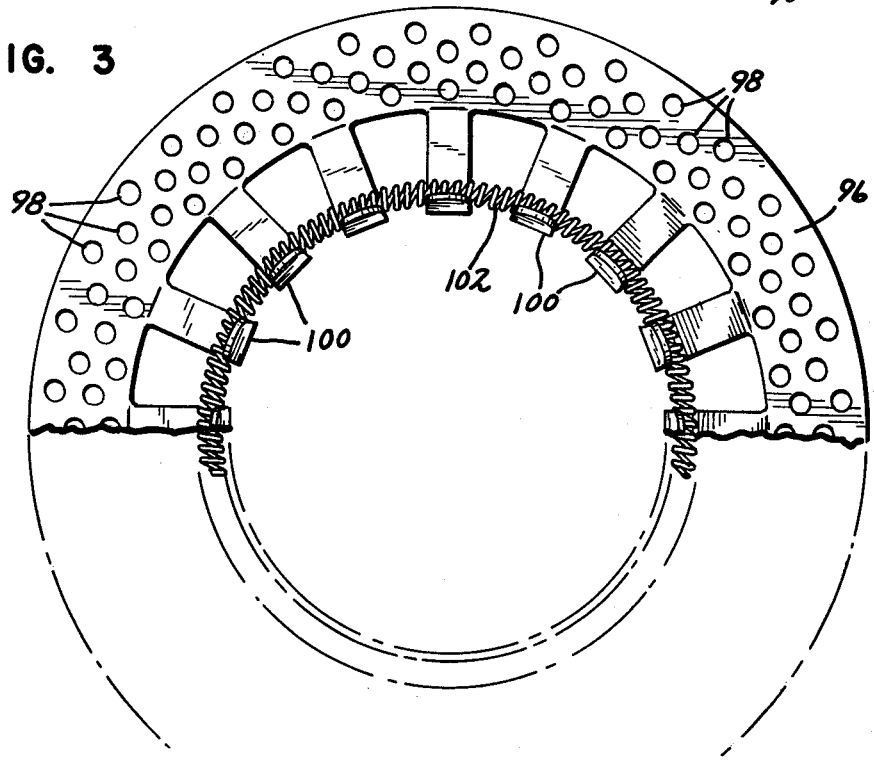
FIG. 3 is a plan view of the annular end cap of the filter element shown in FIG. 2.

FIGS. 2-5 illustrate alternative embodiments of the present invention in which the gasket means is integrally molded with the filter element. In particular, as shown in FIG. 2, a gasket 72 has a first end 74 and a second end 76 which is integrally molded with potting compound to a filter 78. Gasket 72 is an annular member having a continuous inner side wall 80 and an outer side wall 82 between ends 74 and 76. An annular recess 84 is provided in inner side wall 80 between a first rim portion 86 having a first inside diameter and a second rim portion 88 having a second inside diameter greater than the first inside diameter of rim portion 86. The inside diameter of inner side wall 80 decreases gradually from first end 74 to first rim portion 86. Inner side wall 80 diverges in a direction generally away from the central longitudinal axis of annular gasket 72 from second rim portion 88 toward second end 76. Filter 78 may include an annular pleated filter paper medium 90 disposed between apertured concentric inner and outer walls 92 and 94. Filter medium 90 is sealed at its lower end (not shown) and filter 78 is provided with an annular end cap 96. Annular end cap 96 has a plurality of apertures 98 therein to permit the passage of elastomeric material and potting compound therethrough during the process of integrally molding gasket 72 to filter 78. Disposed circumferentially about the inner periphery of end cap 96 is a plurality of spring-like metal fingers 100 which are formed within gasket 72 and extend generally toward the central longitudinal axis of gasket 72 and from end 76 toward end 74. Fingers 100 may be spring-like metal members biased in a direction toward the central longitudinal axis of gasket 72. Alternatively, a coiled spring 102 may be provided to encircle fingers 100 in contact therewith to bias fingers 100 toward the central longitudinal axis of gasket 72. The spring-like metal fingers 100 will typically be provided where the elastomeric material being used is inherently weak or has poor strength characteristics. Such material may be used because of other desirable characteristics in certain environments, such as thermal resistance.

Figure 4:
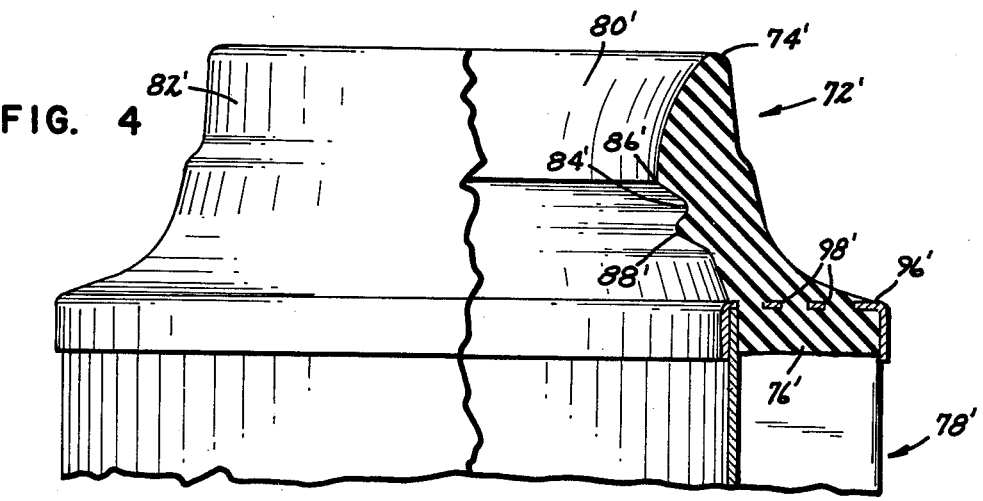
FIG. 4 is a partial elevational view of a second alternative embodiment of the present invention with portions thereof broken away and shown in section.

The embodiment of the present invention shown in FIG. 4 is substantially the same as that shown in FIG. 2 except for the fact fingers 100 are no longer provided. In particular, gasket 72' has a first end 74' and a second end 76' which is molded integrally with filter element 78'. Filter 78' is provided with a top end cap 96' which is essentially U-shaped in cross section and is provided with a plurality of apertures 98' for integrally molding the gasket 72' to filter 78'. Gasket 72' has an inner annular recess 84' disposed between a first rim portion 86' and a second rim portion 88'. The inside diameter of annular gasket 72' at second rim portion 88' is greater than the inside diameter at first rim portion 86'. Gasket 72' has an inside diameter which decreases gradually from first end 74' to annular rim 86' and increases gradually from rim portion 88' to second end 76'.

Figure 5:
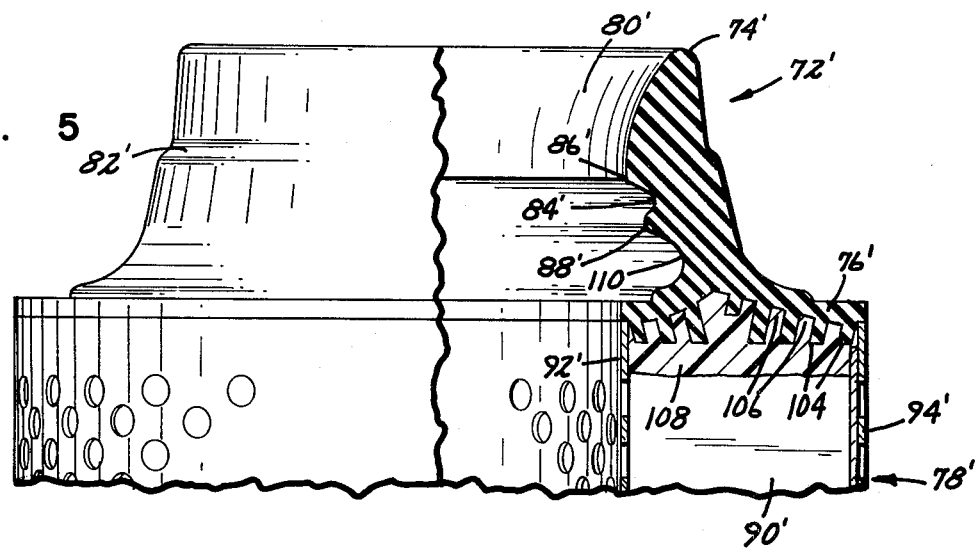
FIG. 5 is a partial elevational view of a third alternative embodiment of the present invention with portions thereof broken away and shown in section.

FIG. 5 discloses an alternative embodiment of the present invention substantially equivalent to the embodiment shown in FIG. 4. In the embodiment of FIG. 5, a gasket 72' has a first end 74' and a second or bottom end 76' which includes a plurality of downwardly extending rings 104. Rings 104 are spaced apart to define grooves 106. A filter 78' may include a pair of concentric inner and outer walls 92' and 94'. Disposed between inner and outer walls 92' and 94' is a filter element 90' which typically may be a pleated paper type filter medium. Downwardly extending rings 104 may be oriented at various angles with respect to the central longitudinal axis of gasket 72'. Gasket 72' is integrally molded to filter 78' by a potting compound 108 which fills grooves 106 and, when cured end 76' is securely adhered to filter 78' and the top end of filter 78' is sealed. Annular gasket 72' has an inner side wall 80' and an outer side wall 82' between ends 74' and 76'. Formed within inner side wall is a first annular recess 84' and a second annular recess 110. Annular recess 84' is disposed between a first annular rim portion 86' having a first inside diameter and a second annular rim portion 88' having a second inside diameter. As previously described with reference to the embodiment of FIG. 1, the inside diameter of gasket 72' at first annular rim portion 86' is less than the inside diameter at second annular rim portion 88'. Annular recess 110 is disposed proximate end 76' and the inside diameter of gasket 72' at annular recess 110 is greater than the inside diameter at rim portions 86' and 88' and first annular recess 84'. Inner side wall 80' slopes gradually in a direction generally toward a central longitudinal axis of gasket member 72' from end 74' to first annular rim portion 86'. Gasket 72' therefore has a decreasing inside diameter between end 74' and first annular rim portion 86'. This embodiment may be utilized in cases wherein a filter element with a solid metal end cap is neither desired nor selected.

Figure 6:
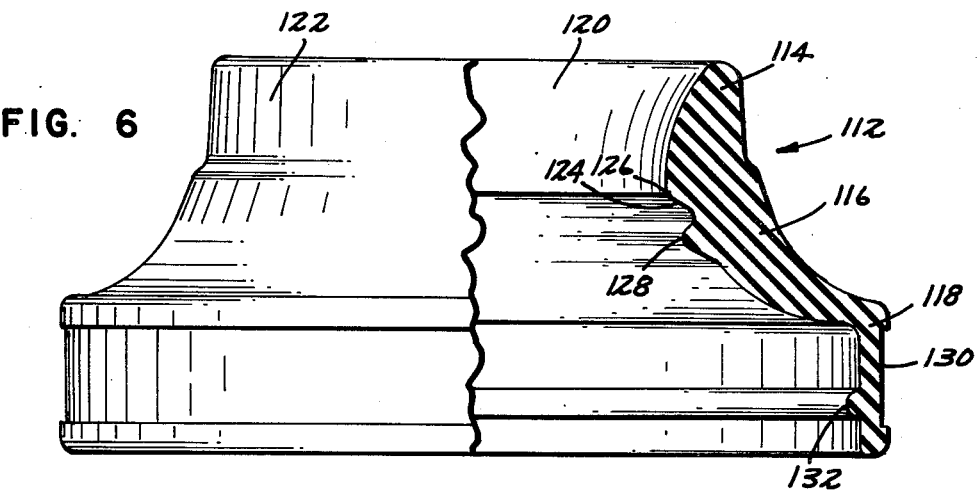
FIG. 6 is a partial elevational view of a fourth alternative embodiment of the present invention with portions thereof broken away and shown in section.
Figure 7:
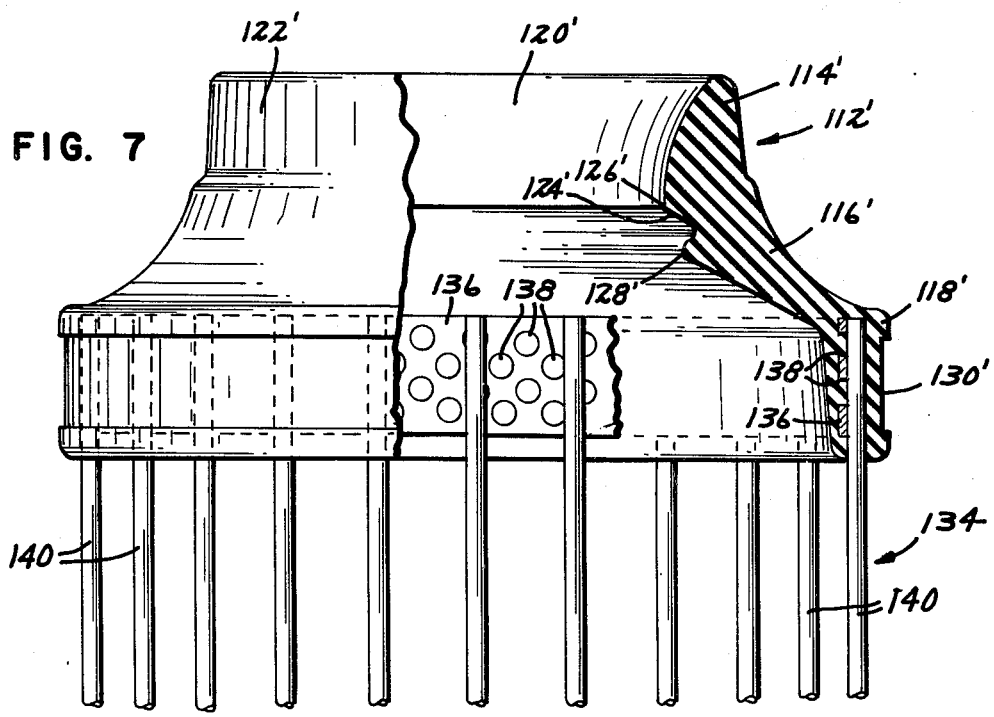
FIG. 7 is a partial elevational view of a fifth alternative embodiment of the present invention with portions thereof broken away and shown in section.

The embodiments illustrated in FIGS. 6 and 7 are designed for use with a bag-type filter element which is typically supported by a bag cage. A gasket 112 is an annular member having a first end portion 114, an intermediate portion 116 and a second end portion 118. Gasket 112 has an inner side wall 120 and an outer side wall 122. Outer side wall 122 tapers generally away from the central longitudinal axis of gasket 112 from first end portion 114 to second end portion 118. The slope of side wall 122 is more pronounced at intermediate portion 116 than at first end portion 114. An annular recess 124 is provided in inner side wall 120 for receiving the flared bottom lip of a venturi air nozzle. Annular recess 124 is disposed between a first ridge portion 126 and a second ridge portion 128. The inside diameter of gasket 112 at second ridge portion 128 is greater than the inside diameter at first ridge portion 126. The inside diameter of gasket 112 gradually decreases from the end of portion 114 to first ridge portion 126. Second end portion 118 is essentially a tubular member having a circumferential groove 130 formed in the outer surface thereof. An annular ridge 132 is provided on inner side wall 120 at second portion 118. A bag cage collar (not shown) is placed within end portion 118 and a suitable clamp (not shown) is placed about end portion 118 in circumferential groove 130 to clamp gasket 112 to the bag cage collar. A bag-type filter element (not shown) may than be secured over the bag cage. The embodiment illustrated in FIG. 6 has the advantage over the prior art devices in that in order to replace the bag filter, the bag cage does not have to be removed from gasket 112. On the contrary, the bag cage remains firmly clamped to gasket 112 while the bag filter is simply disconnected and removed and replaced with a new bag filter.

The embodiment of the present invention as shown in FIG. 7 is substantially equivalent to the embodiment of FIG. 6 with the exception that the bag cage is simply molded integrally with the gasket. A gasket 112' includes a first portion 114' and intermediate portion 116' and a second end portion 118'. Gasket 112' has an inner side wall 120' and an outer side wall 122'. Outer side wall 122' slopes gradually away from a central longitudinal axis of gasket 112' from first end portion 114' to second end portion 118'. Outer side wall 112' slopes more rapidly at intermediate portion 116' that at first end portion 114'. An annular recess 124' is provided in inner side wall 120' for receiving the flared bottom lip of a venturi air nozzle. As in the previous embodiments of the present invention, annular recess 124' is disposed between a first ridge portion 126' and a second ridge portion 128'. The inside diameter of gasket 112' at second ridge portion 128' is greater than the inside diameter at first ridge portion 126'. Inner side wall 120' slopes gradually inward toward the central longitudinal axis of gasket 112' from the end of first end portion 114' to first ridge portion 126'. Gasket 112' thus has a gradually decreasing inside diameter from the end of first end portion 114' to first ridge portion 126'. As previously mentioned, a bag cage 134 includes a collar or band 136 which is imbedded within end portion 118'. Collar 136 is provided with a plurality of apertures 138 to facilitate the molding of collar 136 within end portion 118'. Affixed to collar 136 and extending downwardly therefrom about the circumference of gasket 112' is a plurality of bag support rods 140. Second end portion 118' is provided with a circumferential groove 130' in its outer surface. A bag filter element is secured about bag cage 134 and clamped within circumferential groove 130'. Thus, it can be seen that replacement of the filter bag is a simple process.

From the above description, it can be appreciated that each embodiment of the present invention provides an improved gasket means for securing a filter element to a venturi air nozzle in a dust collector. The alternative embodiments of the gasket means of the present invention are each capable of withstanding a substantial pull-off force in addition to providing an effective seal between the venturi air nozzle and the gasket. In each embodiment, the filter element is held in position entirely below the opening of the venturi air nozzle maximizing the efficiency of reverse-flow cleaning air pulses. The operator time for replacing worn or damaged bags or filter elements in the dust collector is significantly reduced utilizing the gasket structure of the present invention.

We claim:

1. In a dust collector having a venturi air nozzle with a flared bottom lip and a filter element through which air is drawn into the air nozzle, an improved gasket means for securing the filter element to the venturi air nozzle, comprising:
    (a) an annular member of elastomeric material, said annular member having first and second ends, a central axis, and inner and outer side walls, said inner side wall having an annular recess formed therein in which the flared bottom lip of the venturi air nozzle is received, said annular recess disposed between a first rim portion having a first inside diameter and a second rim portion having a second inside diameter, said second inside diameter being greater than said first inside diameter, said first and said second rim portions being disposed along said central axis with said first rim portion between said first end and said annular recess; and
    (b) means for securing said filter element to said second end of said annular member.

2. In combination with a filter element having an annular filter media and an annular end cap secured thereto a gasket for securing the filter element to a venturi air nozzle having a flared bottom lip, comprising:
    an annular member of elastomeric material having first and second ends disposed along a central longitudinal axis and inner and outer side walls therebetween, said annular member having first and second annular recesses formed on said inner side wall, said annular member having a first inside diameter at said first recess and a second inside diameter at said second recess, said second inside diameter being greater than said first inside diameter with said first annular recess sized to snugly receive the flared bottom lip therein and said second annular recess sized to loosely receive the flared bottom lip therein, said first annular recess disposed between a first rim portion having a third inside diameter and a second rim portion having a fourth inside diameter greater than said third inside diameter, said second annular recess disposed proximate said second end and said first annular recess disposed proximate said first end, said first rim portion positioned along said central axis proximate said first end and said second rim portion positioned along said central axis proximate said second end, said second end having a substantially planar surface which is adhesively affixed to the annular end cap of the filter element.

3. The combination in accordance with claim 2 wherein said second end has a central portion, an inner edge portion, an outer edge portion, and a substantially planar end surface adhesively secured to the filter element, said inner and outer edge portions having widths measured in a direction generally along said central longitudinal axis of said annular member substantially smaller than the width of said central portion measured along said central longitudinal axis.

4. The combination in accordance with claim 2 wherein said annular member at said first end thereof has an inside diameter that gradually decreases along said central longitudinal axis of said annular member from said first end toward said first rim portion.

5. In combination with a filter having an annular filter medium, a gasket for attaching the filter to a flared bottom lip of a venturi air nozzle comprising:
(a) an annular member of elastomeric material, said annular member having first and second ends disposed along a central longitudinal axis and inner and outer side walls, said inner side wall having an annular recess formed therein in which the flared bottom lip of the venturi air nozzle is received, said annular recess disposed between a first rim portion having a first inside diameter and a second rim portion having a second inside diameter, said second inside diameter greater than said first inside diameter, and said first rim portion disposed along said central axis nearer than said second rim portion to said first end; and
(b) an annular metal end cap within said second end of said annular member and having a plurality of apertures therein, said annular member molded integrally to the filter.

6. The combination in accordance with claim 5 wherein said annular member at said first end thereof has an inside diameter that gradually decreases along said central longitudinal axis of said annular member from said first end toward said first rim portion.

7. The combination in accordance with claim 5 further comprising a plurality of spring-like fingers secured to said annular end cap within said annular member and extending generally along said central longitudinal axis of said annular member and radially inward toward said longitudinal axis, said spring-like fingers biased to compress said annular member against the flared bottom lip of the venturi air nozzle element.

8. The combination in accordance with claim 7 further comprising a coiled spring formed within and extending circumferentially about said annular member proximate said first end thereof, said coil spring being in contact with said spring-like fingers to bias said spring-like fingers in a direction generally toward a longitudinal axis of said annular member.

9. In combination with a filter element having an annular filter medium, a gasket for securing the filter element to a flared bottom lip of a venturi air nozzle, comprising:
an annular member of elastomeric material, said annular member having first and second ends disposed along a central longitudinal axis and inner and outer sidewalls, said inner side wall having an annular recess formed therein in which the flared bottom lip of the venturi air nozzle is received, said annular recess disposed between a first rim portion having a first inside diameter and a second rim portion having a second inside diameter, said second inside diameter being greater than said first inside diameter, said first rim portions disposed along said central axis with said second rim portion between said first rim portion and said second end said second end of said annular member integrally molded to said filter element, said second end having a plurality of downwardly extending ring members to which said filter is molded.

10. The combination in accordance with claim 9 further comprising a second annular recess formed on said inner side wall, said second annular recess disposed proximate said second end of said annular member and said annular member having a third inside diameter which is greater than said first and said second inside diameters.

11. In combination with a bag-type filter element, an improved gasket means for securing the filter element to a venturi air nozzle having a flared bottom lip, comprising:
(a) an annular member of elastomeric material, said annular member having first and second ends disposed along a central longitudinal axis and inner and outer side walls, said inner side wall having an annular recess formed therein in which the flared bottom lip of the venturi air nozzle is received, said annular recess disposed between a first rim portion having a first inside diameter and a second rim portion having a second inside diameter, said second inside diameter greater than said first inside diameter, said first and second rim portion disposed along said central axis with said second rim portion between said first rim portion and said second end; and
(b) a bag supporting cage molded integrally within said second end of said annular member, said supporting cage comprising a plurality of support rods extending generally downward from said second end of said annular member and disposed about the circumference of said annular member.

12. The combination in accordance with claim 11 wherein said outer side wall of said annular member has a circumferential groove proximate said second end thereof so that said bag-type filter medium may be clamped to said annular member within said circumferential groove.

13. The combination in accordance with claim 11 wherein said annular member at said first end thereof has an inside diameter that gradually decreases along a central longitudinal axis of said annular member from said first end toward said first rim portion.

* * * * *

UNITED STATES PATENT AND TRADEMARK OFFICE
CERTIFICATE OF CORRECTION

PATENT NO. : 4,159,197
DATED : June 26, 1979
INVENTOR(S) : Frederick E. Schuler and Robert A. Skuster It is certified that error appears in the above-identified patent and that said Letters Patent are hereby corrected as shown below:

Claim 9, line 15, after "first" insert --and second--;

Claim 9, line 17, after "end" insert a comma.

Signed and Sealed this

Twentieth Day of November 1979

[SEAL]

Attest:

RUTH C. MASON
Attesting Officer

LUTRELLE F. PARKER
Acting Commissioner of Patents and Trademarks